United States Patent
Kajak (10) Patent No.: US 11,324,346 B2
(45) Date of Patent: *May 10, 2022

(54) TRAY TABLE TRAYS

(71) Applicant: The Boeing Company, Chicago, IL (US)

(72) Inventor: Pawel Kajak, Gdansk (PL)

(73) Assignee: The Boeing Company, Chicago, IL (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/701,745

(22) Filed: Dec. 3, 2019

(65) Prior Publication Data

US 2020/0100609 A1 Apr. 2, 2020

Related U.S. Application Data

(63) Continuation of application No. 15/408,601, filed on Jan. 18, 2017, now Pat. No. 10,517,415.

(51) Int. Cl.
*B65D 81/26* (2006.01)
*A47G 23/06* (2006.01)
(Continued)

(52) U.S. Cl.
CPC .............. *A47G 23/06* (2013.01); *A47G 23/03* (2013.01); *B60N 3/004* (2013.01);
(Continued)

(58) Field of Classification Search
CPC .... B65D 81/261; B65D 81/264; A47G 23/03; A47G 23/06
(Continued)

(56) References Cited

U.S. PATENT DOCUMENTS 3,963,349 A 6/1976 Albright
5,720,999 A 2/1998 Lanzani
(Continued)

FOREIGN PATENT DOCUMENTS

CN 2749830 Y 1/2006
DE 19528040 A1 2/1997
(Continued)

OTHER PUBLICATIONS

Notification of the First Office Action from the National Intellectual Property Administration, PRC dated Nov. 1, 2019 in corresponding China Application No. 2017113102897.
(Continued)

*Primary Examiner* — Luan K Bui
(74) *Attorney, Agent, or Firm* — Ostrager Chong Flaherty & Broitman P.C.

(57) ABSTRACT

Trays for tray tables that prevent liquid spilled on a top surface of the trays from spreading over edges of the trays. A casing having a top surface with at least one aperture through the top surface, a receptacle within the casing positioned below the aperture in the top surface configured to receive an absorbent pad that can be removably positioned in the receptacle below the aperture to be in communication with the top surface of the tray. Spilled liquids can be guided toward the aperture in the top surface and absorbed in the absorbent pad within the casing. The absorbent pad may be a superabsorbent material. The top surface can have a superhydrophobic coating.

20 Claims, 8 Drawing Sheets

(51) Int. Cl.
*A47G 23/03* (2006.01)
*B61D 33/00* (2006.01)
*B60N 3/00* (2006.01)
*B64D 11/06* (2006.01)

(52) U.S. Cl.
CPC ...... *B61D 33/0007* (2013.01); *B64D 11/0638* (2014.12); *B65D 81/261* (2013.01); *B65D 81/264* (2013.01)

(58) Field of Classification Search
USPC ........ 206/204, 557, 562, 563, 567; 220/571, 220/574, 575; 53/400
See application file for complete search history.

(56) References Cited

U.S. PATENT DOCUMENTS

| | | | |
|---|---|---|---|
| 5,908,133 A | 6/1999 | Luburic | |
| 5,979,646 A * | 11/1999 | Strachan | B65D 71/70 |
| | | | 206/562 |
| 6,006,903 A * | 12/1999 | Milone | A24F 25/02 |
| | | | 206/204 |
| 6,036,049 A * | 3/2000 | Hwang | B65D 43/164 |
| | | | 206/515 |
| 6,135,307 A * | 10/2000 | Fahy | A47G 19/02 |
| | | | 220/521 |
| 6,216,855 B1 | 4/2001 | Grone | |
| 6,938,774 B2 | 9/2005 | Extrand | |
| 2006/0060478 A1 | 3/2006 | Christodoulou | |
| 2006/0278559 A1* | 12/2006 | Hamblin | B65D 71/72 |
| | | | 206/562 |
| 2007/0056863 A1* | 3/2007 | Chou | B65D 81/262 |
| | | | 206/204 |
| 2007/0178197 A1* | 8/2007 | LaRue | B65D 81/262 |
| | | | 426/129 |
| 2011/0266168 A1* | 11/2011 | Longo | B65D 81/262 |
| | | | 206/204 |
| 2011/0303679 A1 | 12/2011 | Yu | |
| 2013/0098783 A1* | 4/2013 | Hernandez | F26B 21/083 |
| | | | 206/204 |
| 2015/0291325 A1 | 10/2015 | Chou | |

FOREIGN PATENT DOCUMENTS

| | | |
|---|---|---|
| EP | 0295943 A2 | 12/1988 |
| EP | 0495230 A2 | 7/1992 |
| WO | 9003320 A1 | 4/1990 |
| WO | 2007059187 A1 | 5/2007 |
| WO | 2009020805 A1 | 2/2009 |
| WO | 2012156173 A1 | 11/2012 |
| WO | 2013166067 A1 | 11/2013 |

OTHER PUBLICATIONS

Search Report from the National Intellectual Property Administration, PRC dated Oct. 25, 2019 in corresponding China Application No. 2017113102897.

European Search Report dated Mar. 16, 2018 in corresponding European Patent Application No. 17194836.7.

Office Action from the Canadian Intellectual Property Office dated Dec. 8, 2020 in corresponding Canadian Application No. 2,983,496.

* cited by examiner

TRAY TABLE TRAYS

TECHNICAL FIELD

This disclosure relates generally to portable tables and, more particularly, to trays for use in tray tables that prevent liquids spilled on a top surface of the tray from spreading over the edges of the top surface and provide for easy cleanup.

BACKGROUND

Tray tables generally consist of a tray mounted on folding legs or a tray mounted on or in a piece of furniture, such as an airplane or train seatback, and designed to fold or swing out of the way for storage. For example, a tray table may be stowed flat against an airplane seatback and readily folded down to a generally horizontal usable position to provide a surface upon which a passenger can place a drink and/or eat a meal. Such trays are typically affixed to the seatback by a pair of arms that are pivotally attached to the seatback and to the tray, and often have a top surface with recessed areas therein where glasses, bottles, cups or cans can be placed. The recessed areas reduce the risk of knocking over the glasses, bottles, cups or cans, but they do not prevent liquid from spreading over the tray's top surface or over the edges of the tray once a liquid has been spilled.

It is common, particularly in airplanes, trains and other vehicles, for drinks resting on a tray table surface to be spilled for various reasons such as vibration resulting from vehicle movement, severe turbulences and passenger inadvertence. Tray table trays are typically made from a lightweight plastic-type material or other materials that are hydrophobic. Spilled liquids can freely spread over the tray surface and drip over the edges of the tray, dirtying the vehicle interior and the passenger's clothing. This can influence passenger satisfaction, and requires that the spill be cleaned up prior to the next departure for the vehicle. For liquids that are difficult remove, such as red wine, additional time and cleaning supplies may be necessary.

SUMMARY

In accordance with some aspects of this disclosure, the tray comprises a casing having a top surface with at least one aperture through the top surface and a receptacle within the casing positioned below the aperture in the top surface. The receptacle is configured to receive an absorbent pad, which can be removably positioned in the receptacle below the aperture to be in communication with the top surface, such that liquid spilled on the top surface can flow through the aperture and into the absorbent pad. The absorbent pad can be a superabsorbent material that can absorb and retain large amounts of a liquid relative to its own mass so that it quickly absorbs any spilled liquid on the top surface of the tray and reduces the frequency of having to replace the absorbent material. A superhydrophobic coating can be applied on the top surface of the casing to provide a high degree of liquid repellency. The geometry of the top surface can be configured to guide any liquid spilled on the tray toward the aperture through the top surface and into the absorbent pad.

In accordance with one aspect of the disclosure, the top surface comprises three elongated apertures positioned proximate three sides (a rear side, a left side and a right side) of the casing. The top surface of the casing can be generally flat and may have a raised edge at a front side of the casing that forms a barrier to prevent a liquid spilled on the top surface from dripping over the raised edge and to guide the liquid toward the elongated apertures in the rear side, the left side and the right side of the casing.

In accordance with another aspect of the disclosure, the top surface comprises at least one sloped portion that is sloped down toward and terminates at the aperture through the top surface. The sloped portion can guide a liquid spilled on the top surface toward the aperture and into the absorbent pad. The slope of the sloped portion can be slight, just enough to provide the guiding function without causing objects placed on the sloped portion to fall over. For example, the top surface may have a single elongated aperture extending generally parallel to, and positioned proximate, a rear side of the casing, such that the elongated aperture extends a substantial part of the width of the rear side. The sloped portion of the top surface may have a width at least as wide as the width of the elongated aperture and the slope of the sloped portion may cause the front side of the top surface to be at a higher level than the rear side of the top surface. The top surface can include a first raised edge at a left side of the casing and a second raised edge at right side of the casing to form a barrier to prevent a liquid spilled on the top surface from dripping over the left side and the right side of the casing and to further guide the liquid toward the elongated aperture.

In another example, the aperture is positioned proximate a center of the top surface and the top surface comprising four slopes extending from the right side, left side, rear side and front side of the casing down toward the aperture in the center of the top surface. The slope of the sloped portions can cause the center of the top surface to be at a lower level than all of the sides of the top surface, and permit the aperture to act as a central drain.

In yet other aspects of the disclosure, a method for manufacturing a tray for tray table that can prevent a liquid spilled on a top surface of the tray from spreading over an edge of the tray is provided. The method includes the steps of forming a casing having a receptacle within the casing and a top surface with at least one aperture through the top surface in communication with the receptacle, such that during use a removable absorbent pad can be inserted in the receptacle below the aperture and in communication with the top surface. The absorbent pad can be a superabsorbent material that can absorb and retain large amounts of a liquid relative to its own mass so that it quickly absorbs any spilled liquid on the top surface of the tray and reduces the frequency of having to replace the absorbent material. The step of forming the casing can include forming an opening through a side of the casing in communication with the receptacle, such that the removable absorbent pad may be inserted and removed from the receptacle through the opening, applying a superhydrophobic coating on the top surface of the casing to provide a high degree of liquid repellency, and configuring the top surface to guide any liquid spilled on the tray toward the aperture through the top surface and into the absorbent pad.

The features, functions and advantages that have been discussed, as well as other objects, features, functions and advantages of the tray can be achieved independently in various examples of the disclosure or may be combined in yet other examples, further details of which can be seen with reference to the following description and drawings.

DETAILED DESCRIPTION

The trays described herein can prevent spilled liquids from spreading outside the tray surface and provide for quick and easy clean-up. The foregoing benefit as well as others, are achieved by a tray for a tray table that collects liquid spilled on a top surface of the tray in a replaceable absorbent pad positioned in a receptacle within the tray, and therefore reduces the risk of spilled liquid spreading over edges of the tray and dirtying the surrounding area and user of the tray table. The replaceable pad is easily inserted into and removed from the receptacle in the tray, and can include an indicator for indicating when the absorbent pad has reached maximum capacity and requires replacement.

In the following detailed description and the drawing figures, illustrative embodiments of a tray 10 for a tray table and methods for preventing a liquid spilled on a top surface 12 of a tray 10 from spreading over an edge 14 of the tray 10 are described. The description is merely exemplary in nature and is not intended to limit the disclosed tray or the application and uses of the disclosed tray. It will be recognized by one skilled in the art that the present disclosure may be practiced in a variety of applications or environments and/or with other analogous or equivalent variations of the illustrative examples. For example, the concepts and teachings disclosed herein may be applied to a tray of the type used with tray tables on seatbacks in aircraft, trains and other vehicles, or any other type of portable table or surface upon which a liquid could spill.

It should be noted that those methods, procedures, components, or functions which are commonly known to persons of ordinary skill in the field of the disclosure are not described in detail herein. A person skilled in the art will appreciate that in the development of an actual embodiment, numerous implementation-specific decisions must be made to achieve the developer's specific goals, which will vary from one implementation to another. Moreover, it will be appreciated that such a development effort might be complex and time-consuming, but would nevertheless be a routine undertaking for those of ordinary skill in the art having the benefit of this disclosure.

Referring to the drawings, the tray 10 comprises a casing 16 having a top surface 12 with at least one aperture 18 through the top surface 12. The aperture 18 acts as a drain for liquid that is spilled on the top surface 12. The aperture 18 may take any form including, without limitation, a round, square or rectangular shaped hole or slot. The aperture 18 need not be covered, but may have a pervious or mesh cover placed over the aperture 18. The casing 16 may be made from any type of lightweight, moldable and sturdy material, such as aluminum, metal or plastic, and formed into a shape suitable for a particular use. For example, the tray 10 may have a generally rectangular shape and be used in a tray table that is pivotably and foldably attached to a seatback in an airplane or train, such that the tray table can be selectively folded down by a passenger seated in the immediately rearward seat.

Figure 1:
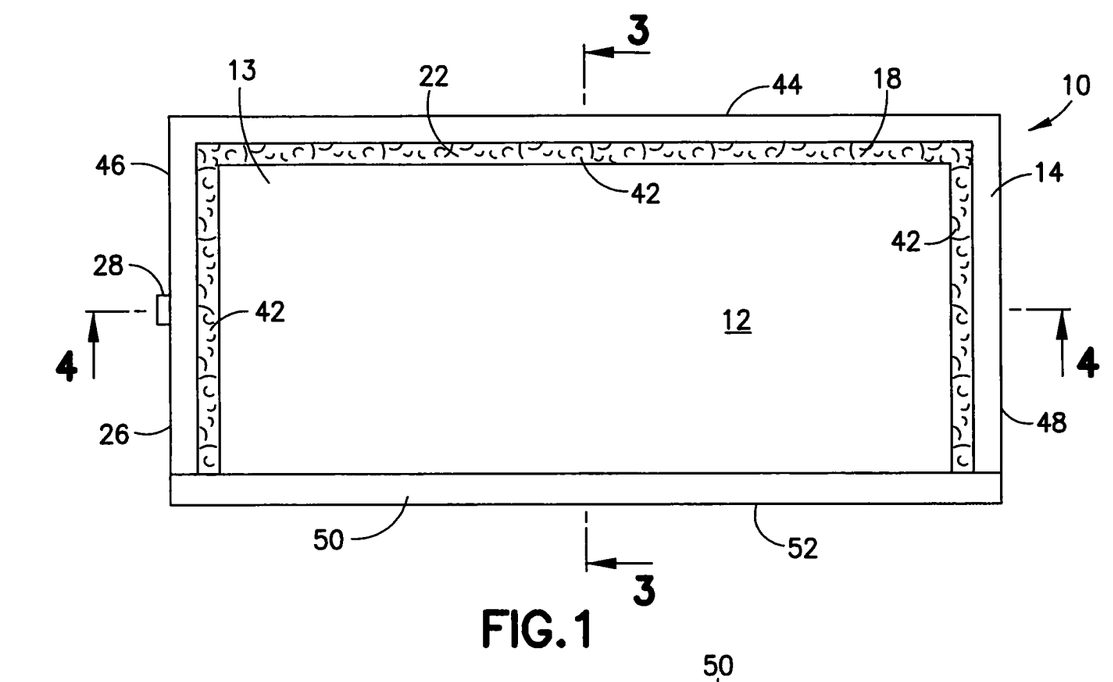
FIG. 1 is a diagram representing a top view of a tray for a tray table in accordance with some aspects of this disclosure.
Figure 2:
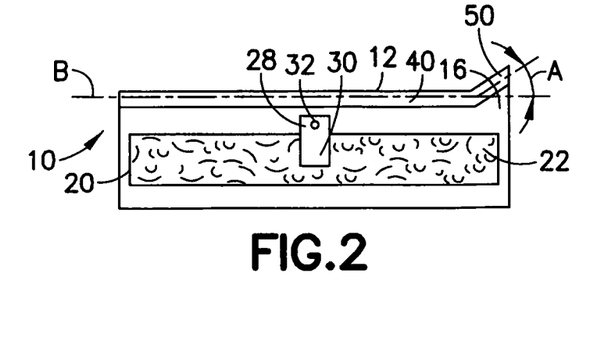
FIG. 2 is a diagram representing a left side view of the tray shown in FIG. 1.
Figure 3:
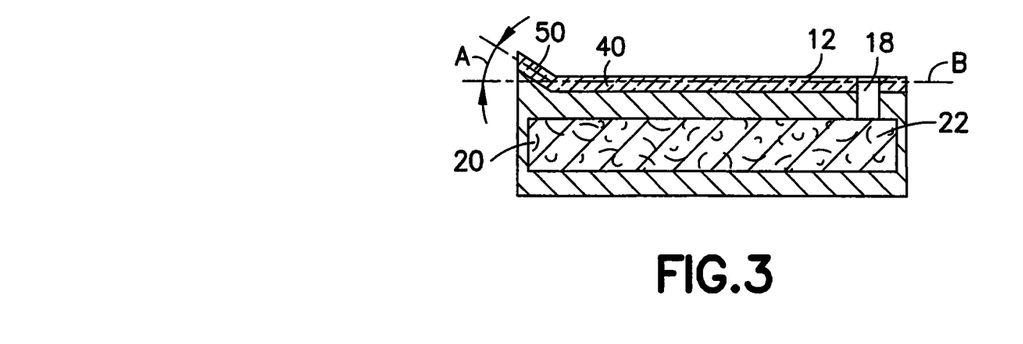
FIG. 3 is a diagram representing a cross-sectional view of the tray taken along the line 3-3 in FIG. 1.
Figure 4:
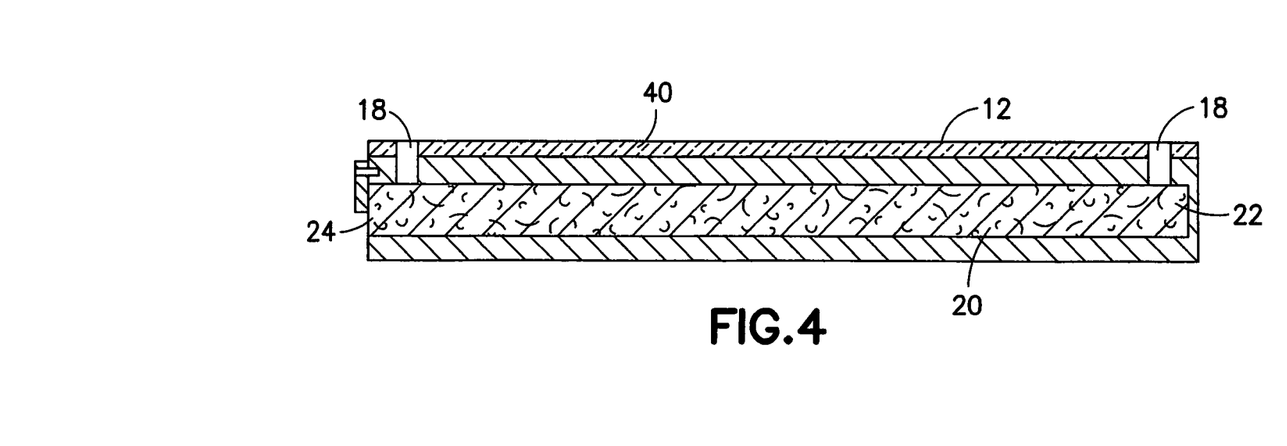
FIG. 4 is a diagram representing a cross-sectional view of the tray taken along the line 4-4 in FIG. 1.
Figure 5:
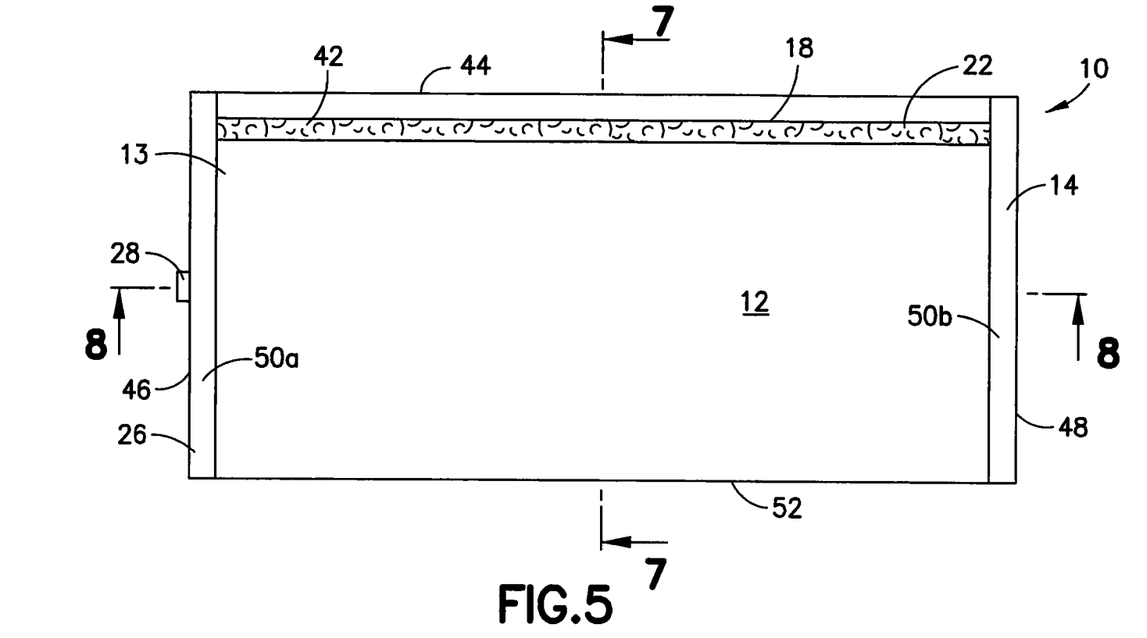
FIG. 5 is a diagram representing a top view of a tray for a tray table in accordance with other aspects of this disclosure.
Figure 6:
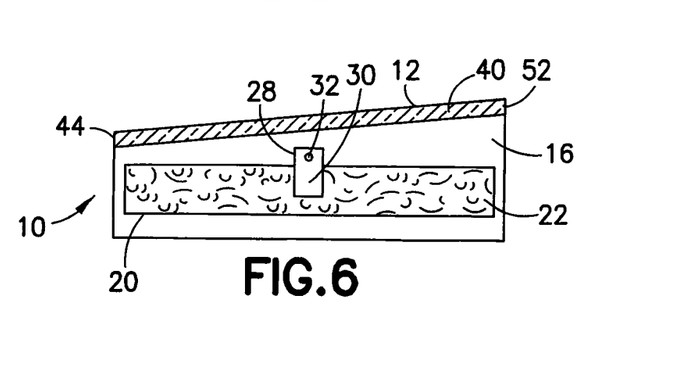
FIG. 6 is a diagram representing a left side view of the tray shown in FIG. 5.
Figure 7:
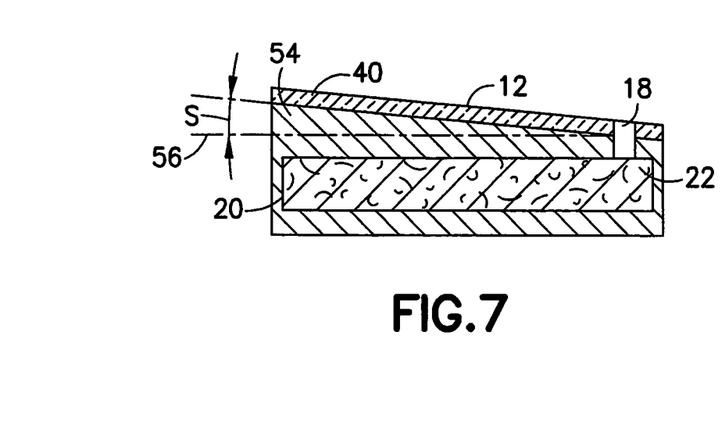
FIG. 7 is a diagram representing a cross-sectional view of the tray taken along the line 7-7 in FIG. 1.
Figure 8:
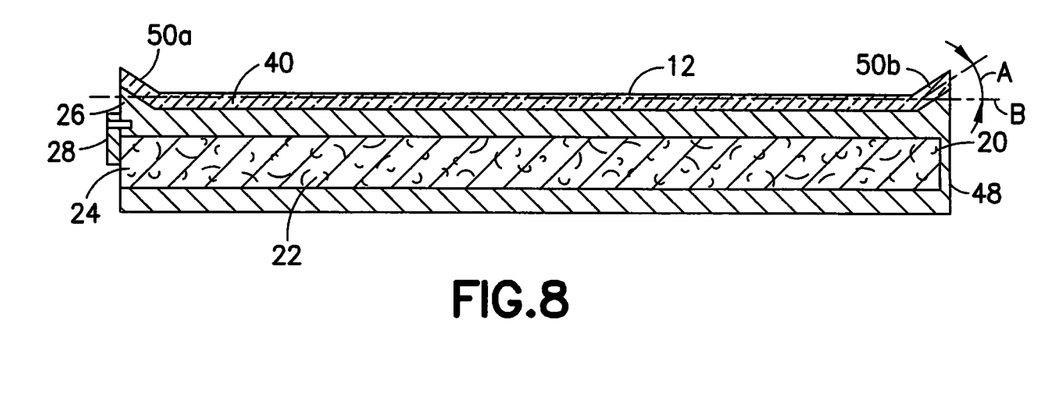
FIG. 8 is a diagram representing a cross-sectional view of the tray taken along the line 8-8 in FIG. 1.
Figure 9:
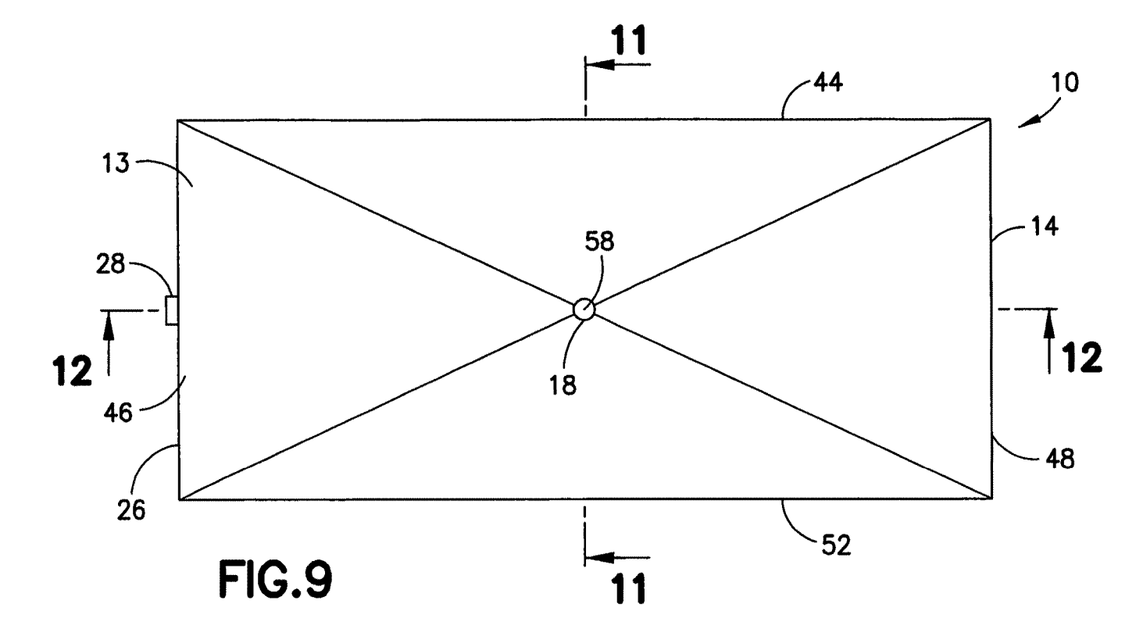
FIG. 9 is a diagram representing a top view of a tray for a tray table in accordance with still other aspects of this disclosure.
Figure 10:
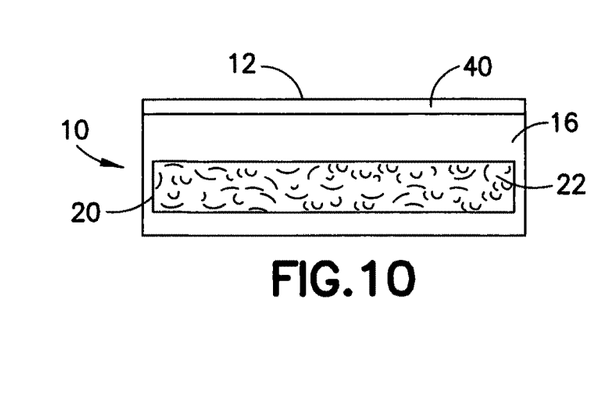
FIG. 10 is a diagram representing a left side view of the tray shown in FIG. 9.
Figure 11:
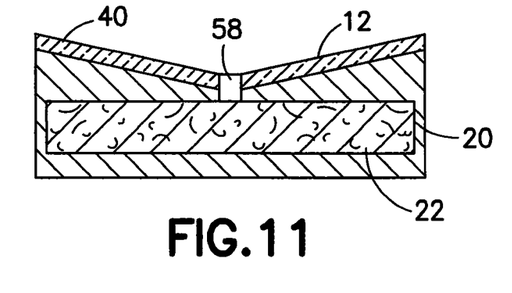
FIG. 11 is a diagram representing a cross-sectional view of the tray taken along the line 11-11 in FIG. 9.
Figure 12:
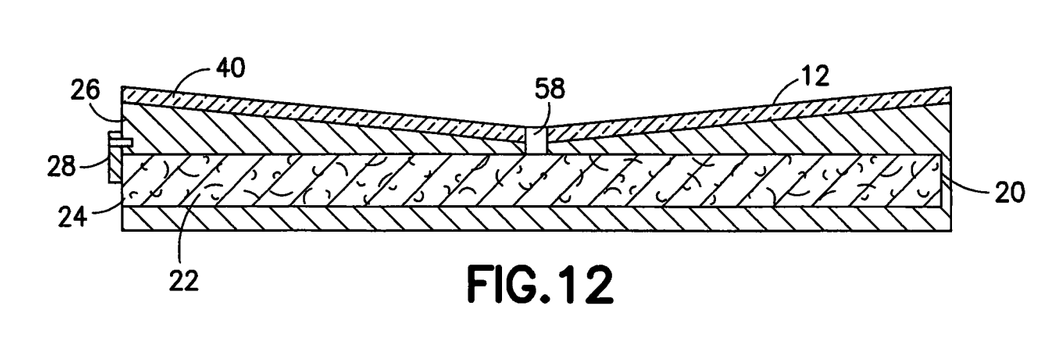
FIG. 12 is a diagram representing a cross-sectional view of the tray taken along the line 12-12 in FIG. 9.

Referring more particularly to FIGS. 2-4, 6-8 and 10-12, a receptacle 20 is positioned within the casing 16 and below the aperture 18 in the top surface 12, and configured to receive an absorbent pad 22 that can be removably positioned in the receptacle 20 below the aperture 18 to be in communication with the top surface 12. The absorbent pad 22 is configured to absorb liquid that spills on the top surface 12 and enters the aperture 18. The receptacle 20 extends under substantially an entire area 13 of the top surface 12, and the absorbent pad 22 substantially fills the receptacle 20 such that the absorbent pad 22 fills between about 25% to 80% of the volume of the receptacle 20. The casing 16 has an opening 24 in a side 26 of the casing 16 in communication with the receptacle 20 that permits insertion and removal of the absorbent pad 22 into and out of the receptacle 20. As shown in FIGS. 2 and 6, a locking device 28 may optionally be included for maintaining the absorbent pad 22 in the receptacle 20. For example, a pivotable bar 30 may be positioned on the side 26 of the casing 16 to rotate about a pivot point 32 positioned above or below the opening 24, such that the pivotable bar 30 is moveable between a horizontal position that permits entry of the absorbent pad 22 and a vertical position that blocks the opening 24 and prevents the absorbent pad 22 from being removed.

In use, it is desirable to use an absorbent pad 22 that does not require frequent replacement, and can be used until the absorbent pad 22 reaches its maximum capacity without leaking. An absorbent pad 22 comprising a superabsorbent material, such as a superabsorbent polymer (SAP) that can absorb and retain extremely large amounts of a liquid relative to its own mass, meets those goals. For example, in a 0.9% saline solution, a SAP may absorb about 50 times its weight, and in deionized and distilled water, a SAP may absorb about 300 times its weight. Superabsorbent polymer (SAP) is made from the polymerization of acrylic acid blended with sodium hydroxide in the presence of an initiator to form a poly-acrylic acid sodium salt (sometimes referred to as sodium polyacrylate). Commercial products based on SAP materials are often referred to as slush powder. Superabsorbent polymers also act as smell absorbers, which will prevent odors from the liquid absorbed therein from permeating from the SAP, and therefore extend the life of the SAP before replacement. Alternatively, an absorbent, but not superabsorbent, silica gel—a $SiO_2$ based polymer—may be used instead of the SAP.

Figure 13:
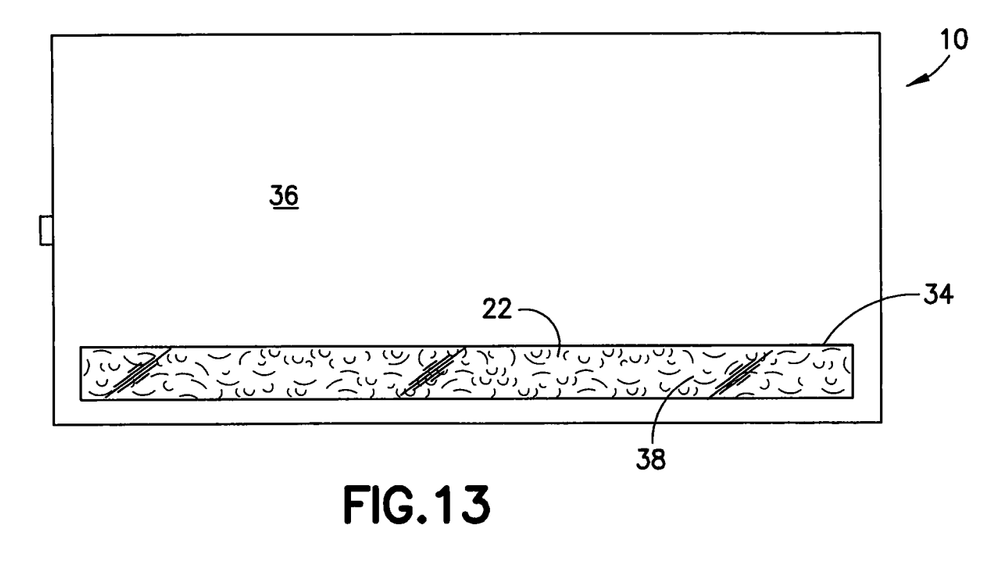
FIG. 13 is a diagram representing a bottom view of the trays shown in any of FIGS. 1-12.

The state of the absorbent pad 22 may be checked visually or by touch by sliding the absorbent pad 22 out of the receptacle 20. Alternatively, a visual indicator may be provided to assess the amount of liquid absorbed in the absorbent pad 22 and indicate when the absorbent pad 22 has reached its maximum capacity and should be replaced. For example, a piece of material that dissolves in water-based liquids may be positioned at a point that is located in the furthermost spot from the aperture 18. SAP material or Silica gel may be doped with a moisture indicator that gradually changes its color when it transitions from the anhydrous (dry) state to the hydrated (wet) state. Common indicators are cobalt chloride and methyl violet. Digital humidity meters may also be located in at least three different locations inside the absorber, and the measurements can be combined and presented on the visible side of absorber, for example with LEDs or a simple LCD display. All such indicators may be checked either by sliding the absorbent pad 22 out of the receptacle 20 or through an optional window 34 through a bottom 36 of the casing 16, as shown in FIG. 13, positioned below the absorbent pad 22. The window 34 is covered with a clear plastic or glass covering 38 that permits visual inspection of the absorbent pad 22.

It is also desirable to provide a top surface 12 of the casing 16 that repels a liquid spilled on the top surface 12 (and prevents the liquid from permeating into the top surface 12) to assist the liquid's movement toward the aperture 18 and into the absorbent pad 22. One way to provide such a surface is to coat a superhydrophobic coating 40 on the top surface 12 of the casing 16 such that the superhydrophobic coating 40 becomes a part of the top surface 12. A superhydrophobic coating 40 is a nanoscopic surface layer that repels liquids. Droplets hitting the superhydrophobic coating 40 can fully rebound in the shape of a column or pancake and glide across the superhydrophobic coating 40. The property that is used for characterizing hydrophobicity of a material is the contact angle between a liquid droplet and the surface of material. Superhydrophobicity is achieved when the contact angle is above 150 degrees. The top surface 12 of the casing 16 should therefore have a contact angle between a liquid droplet and the top surface 12 greater than 150 degrees. Materials suitable for providing the superhydrophobic coating 40 are based on nano-composites like manganese oxide polystyrene, zinc oxide polystyrene, or silica nanoparticles. Examples of commercially-available materials suitable for the superhydrophobic coating 40 include, but are not limited to, NEVERWET® coatings available from NeverWet, LLC of Lancaster, Pa., superhydrophobic materials available from Aculon, Inc. of San Diego, Calif., and ULTRA EVER DRY® available from UltraTech International, Inc. of Jacksonville, Fla.

The geometry of the top surface 12 of the casing 16 can be arranged in many different configurations to achieve the desired result of guiding a spilled liquid toward the at least one aperture 18 in the top surface such that the liquid is absorbed into the absorbent pad 22 positioned in the receptacle 20. FIGS. 1-4 show a first example of a surface geometry, wherein the top surface 12 comprises three elongated apertures 42. The elongated apertures 42 extend linearly generally parallel to, and are positioned proximate to, a rear side 44, a left side 46 and a right side 48 of the casing 16. The elongated apertures 42 have a width of about 3-6 mm to limit the capillary effect that could block liquid from efficiently moving through the aperture 18 to the absorbent pad 22, but other widths may be employed for different tray 10 designs. In this example, the top surface 12 of the casing 16 is generally flat and has a raised edge 50 at a front side 52 of the casing 16 that forms a barrier to prevent a liquid spilled on the top surface 12 from dripping over the raised edge 50. The raised edge 50 also serves to guide the liquid toward the elongated apertures 42 in the rear side 44, the left side 46 and the right side 48 of the casing 16. The raised edge 50 has an angle A relative to the plane B of the top surface 12 up to 90 degrees, and preferably greater than 30 degrees. Although not shown in this example, the top surface 12 may also include one or more sloped portions having a slope of about 0.5 to 1.0 degree that are sloped down toward the elongated apertures 42. The sloped portions provide a direction for a liquid to move along the top surface 12, and may be used to reduce the number of apertures 18 or the size of the apertures 18.

In other examples, the top surface 12 of the casing 16 has at least one sloped portion 54 sloped down toward and terminating at the aperture 18 through the top surface 12. The slope S of the sloped portion 54 is slight, just enough to provide the guiding function without causing objects placed on the sloped portion to fall over, for example, the sloped portion 54 has a slope S of about 0.5 to 1.0 degree relative to a horizontal plane 56 of the casing 16. FIGS. 5-8 show a tray 10 having a top surface 12 with a sloped portion 54 that is sloped from the front side 52 of the casing 16 down toward the rear side 44 of the casing; that is the slope S of the sloped portion 54 causes the front side 52 of the top surface 12 to be at a higher level than the rear side 44 of the top surface 12. The sloped portion 54 terminates at the aperture 18 through the top surface 12, which is configured in this example as a single elongated aperture 42 extending linearly generally parallel to, and positioned proximate to, the rear side 44 of the casing 16, such that the elongated aperture 42 extends a substantial part of the width of the rear side 44. The slope S of the sloped portion 54 guides a liquid spilled on the top surface 12 toward the aperture 18 and into the absorbent pad 22. The sloped portion 54 has a width at least as wide as the width of the elongated aperture 42. In this example, the top surface 12 of the casing 16 includes a first raised edge 50a at a left side 46 of the casing 16 and a second raised edge 50b at a right side 48 of the casing 16 to form a barrier to prevent a liquid spilled on the top surface 12 from dripping over the left side 46 and the right side 48 of the casing 16 and to further guide the liquid toward the elongated aperture 42.

FIGS. 9-12 show another example of a tray 10 having sloped portions 54 in the top surface 12 of the casing 16. In this example, the aperture 18 is configured as a round hole that is positioned proximate a center 58 of the top surface 12. The hole in the center 58 need not be round; it could be square, rectangular or any other shape. The top surface 12 has four sloped portions 54 extending from a right side 48, a left side 46, a rear side 44 and a front side 52 of the casing 16 that all slope downward toward the aperture 18 in the center 58 of the top surface 12. The sloped portions 54 have a slope of about 0.5 to 1.0 degrees that causes the center 58 of the top surface 12 to be at a lower level than all of the sides of the top surface 12, and permits the aperture 18 to act as a central drain. The features described with respect to FIGS. 1-4, FIGS. 5-8, FIGS. 9-12, and FIG. 13 can be combined in any number of ways that prevent a liquid from flowing over an edge of the tray 10 and/or to channel the liquid to the absorbent pad 22 within the casing 16.

Figure 14:
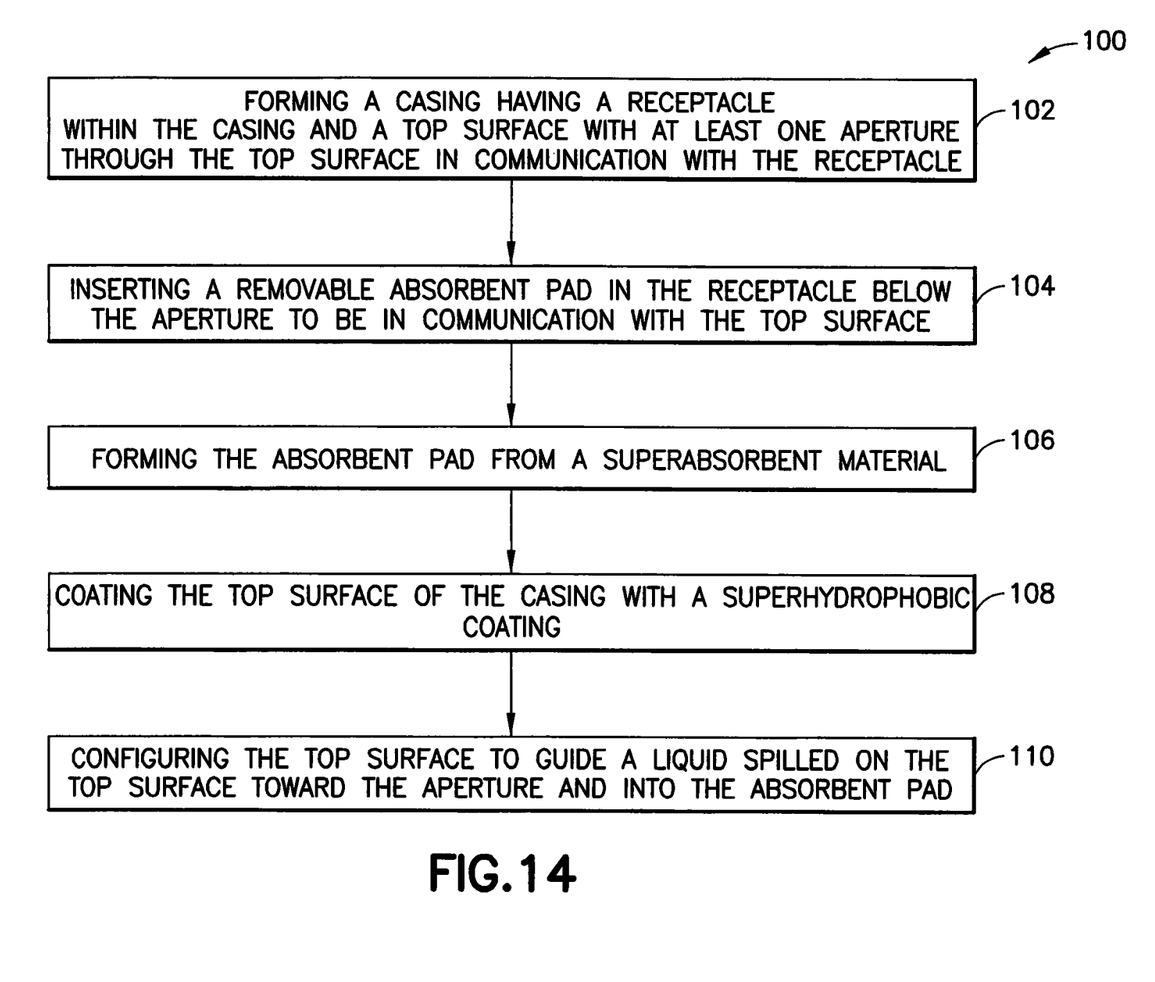
FIG. 14 is a flow chart of a method of manufacturing a tray for a tray table.

Referring to FIG. 14, a method 100 for making a tray 10 for a tray table as shown in FIGS. 1-13 that can prevent a liquid spilled on a top surface 12 of the tray 10 from spreading over an edge 14 of the tray 10 is provided. In step 102, a casing 16 is formed having a receptacle 20 within the casing 16 and a top surface 12 with at least one aperture 18 through the top surface 12 in communication with the receptacle 20. In step 104, during use, a removable absorbent pad 22 is inserted into the receptacle 20 below the aperture 18 to be in communication with the top surface 12. As disclosed above, in step 106, the absorbent pad 22 can be a superabsorbent material that can absorb and retain large amounts of a liquid relative to its own mass so that it quickly absorbs any spilled liquid on the top surface 12 of the tray 10 and reduces the frequency of having to replace the absorbent pad 22. In step 108, a superhydrophobic coating 40 can be coated on the top surface 12 of the casing 16 to provide a high degree of liquid repellency. In step 110, the top surface 12 can be configured to guide any liquid spilled on the tray 10 toward the aperture 18 through the top surface 12 and into the absorbent pad 22.

While the tray 10 has been described with reference to various embodiments, it will be understood by those skilled in the art that various changes may be made and equivalents may be substituted for elements thereof without departing from the teachings herein. For example, and without limitation, the shape of the tray 10, the area of the top surface 13, the angle A of the raised edge 50, and other elements may be adjusted to accommodate other design considerations. The tray 10 may be manufactured and sold with or without the absorbent pad. In addition, many modifications may be made to adapt the concepts and reductions to practice disclosed herein to a particular situation. Accordingly, it is intended that all such modifications and variations be considered as within the spirit and scope of this disclosure, as defined in the following claims, and that the subject matter covered by the claims not be limited the disclosed embodiments. The process claims set forth hereinafter should not be construed to require that the steps recited therein be performed in the order in which they are recited or in alphabetical order (any alphabetical ordering in the claims is used solely for the purpose of referencing previously recited steps).

The invention claimed is:

1. A tray for a tray table that is pivotably attached to a seatback and movable between a stowed position and a generally horizontal usable position, the tray comprising:
a casing having a top surface with at least one aperture through the top surface, a bottom surface, and side surfaces surrounding the casing and connecting the top surface to the bottom surface, the top surface of the casing providing a usable table surface when the tray table is moved into the generally horizontal usable position, and one of the side surfaces of the casing having an opening therethrough in communication with a receptacle within the casing that permits insertion and removal of an absorbent pad into and out of the receptacle through the opening, the receptacle positioned below the aperture in the top surface of the casing such that the receptacle is in communication with the top surface through the aperture; and
a pivotable bar positioned proximate the opening in the casing and moveable between a horizontal position that permits entry through the opening and a vertical position that blocks the opening.

2. The tray according to claim 1, further comprising a superhydrophobic coating on the top surface of the casing that provides the top surface with a contact angle between a liquid droplet and the top surface greater than 150 degrees.

3. The tray according to claim 1, wherein the receptacle extends under substantially an entire area of the top surface.

4. The tray according to claim 1, further comprising a window through the bottom surface of the casing positioned below the receptacle that permits visual inspection of the receptacle.

5. The tray according to claim 1, wherein the top surface comprises three elongated apertures, the elongated apertures positioned proximate a rear side, a left side and a right side of the casing.

6. The tray according to claim 5, wherein the top surface further comprises a raised edge at a front side of the casing that forms a barrier to prevent a liquid spilled on the top surface from dripping over the raised edge and to guide the liquid toward the elongated apertures in the rear side, the left side and the right side.

7. The tray according to claim 1, wherein the top surface comprises at least one sloped portion sloped down toward and terminating at the aperture through the top surface.

8. The tray according to claim 7, wherein the sloped portion has a slope of about 0.5 to 1.0 degree.

9. The tray according to claim 7, wherein the top surface comprises an elongated aperture extending generally parallel to, and positioned proximate, a rear side of the casing.

10. The tray according to claim 9, wherein the top surface further comprises a first raised edge at a left side of the casing and a second raised edge at a right side of the casing that form a barrier to prevent a liquid spilled on the top surface from dripping over the left side and the right side of the casing and to guide the liquid toward the elongated aperture.

11. The tray according to claim 7, wherein the aperture is positioned proximate a center of the top surface, the top surface comprising four slopes extending from a right side, a left side, a rear side and a front side of the casing down toward the aperture in the center of the top surface.

12. A method for making a tray for a tray table that is pivotably attached to a seatback and movable between a stowed position and a generally horizontal usable position, the method comprising:
forming a casing having a receptacle within the casing, a top surface with at least one aperture through the top surface in communication with the receptacle, a bottom surface, side surfaces surrounding the casing and connecting the top surface to the bottom surface, and an opening through one of the side surfaces in communication with the receptacle that permits insertion and removal of an absorbent pad into and out of the receptacle through the opening, the top surface providing a usable table surface when the tray is moved into the generally horizontal usable position; and
providing a pivotable bar proximate the opening and moveable between a horizontal position that permits entry through the opening in one of the side surfaces and a vertical position for blocks the opening.

13. The method of claim 12, further comprising coating the top surface of the casing with a superhydrophobic coating to provide the top surface with a contact angle between a liquid droplet and the top surface greater than 150 degrees.

14. The method of claim 12, wherein the step of forming the casing further comprises forming the top surface with at least one sloped portion sloped down toward and terminating at the aperture through the top surface.

15. The method of claim 12, further comprising the step of extending the receptacle under substantially an entire area of the top surface.

16. The method of claim 12, further comprising the step of positioning a window through a bottom of the casing to permit visual inspection of the receptacle.

17. The method of claim 12, wherein the step of forming the casing further comprises forming three elongated apertures through the top surface, the elongated apertures positioned proximate a rear side, a left side, and a right side of the casing, and a raised edge at a front side of the casing that forms a barrier to prevent a liquid spilled on the top surface from dripping over the raised edge and to guide the liquid toward the elongated apertures in the rear side, the left side and the right side.

18. The method of claim 12, wherein the step of forming the casing further comprises forming at least one sloped portion in the top surface that is sloped down toward and terminating at the aperture through the top surface, and an elongated aperture extending generally parallel to and positioned proximate to a rear side of the casing.

19. A tray for a tray table that is pivotably attached to a seatback and movable between a stowed position and a generally horizontal usable position, the tray comprising:

a casing having a top surface with at least one aperture through the top surface, a bottom surface, and side surfaces surrounding the casing and connecting the top surface to the bottom surface, the top surface of the casing providing a usable table surface when the tray table is moved into the generally horizontal usable position, and one of the side surfaces of the casing having an opening therethrough in communication with a receptacle within the casing that permits insertion and removal of an absorbent pad into and out of the receptacle through the opening, the receptacle positioned below the aperture in the top surface of the casing such that the receptacle is in communication with the top surface through the aperture; and a superhydrophobic coating on the top surface of the casing that provides the top surface with a contact angle between a liquid droplet and the top surface greater than 150 degrees.

20. The tray according to claim 19, wherein the receptacle extends under substantially an entire area of the top surface and the bottom surface comprises a window positioned below the receptacle that permits visual inspection of the receptacle.

* * * * *